United States Patent [19]

Wagner et al.

[11] Patent Number: 5,077,103

[45] Date of Patent: Dec. 31, 1991

[54] REFRACTORY SOLID-STATE HEAT PIPES AND HEAT SHIELDS

[75] Inventors: William R. Wagner, Los Angeles; Sandor Holly, Woodland Hills, both of Calif.

[73] Assignee: Rockwell International Corporation, El Segundo, Calif.

[21] Appl. No.: 543,007

[22] Filed: Jun. 25, 1990

[51] Int. Cl.⁵ .................... B29D 22/00; F28D 15/02; F28F 19/02

[52] U.S. Cl. .............................. 428/34.1; 165/104.14; 165/180; 165/133; 165/185; 165/905; 264/239; 428/408

[58] Field of Search ..................... 428/35.8, 34.1, 36.9, 428/408; 423/445, 446; 244/117 R, 117 A, 158 R, 121; 264/239, 241; 165/104.14, 180, 133, 185, 905

[56] References Cited

U.S. PATENT DOCUMENTS

| | | | |
|---|---|---|---|
| 3,430,898 | 3/1969 | Parechanian et al. | 244/123 |
| 4,396,677 | 8/1983 | Intrater et al. | 428/408 |
| 4,617,181 | 10/1986 | Yazu et al. | 423/446 |
| 4,822,466 | 4/1989 | Rabalais et al. | 204/192.15 |
| 4,838,346 | 6/1989 | Camarda et al. | 244/117 A |
| 4,863,529 | 9/1989 | Imai et al. | 148/33.4 |

Primary Examiner—James J. Seidleck
Assistant Examiner—Charles R. Nold
Attorney, Agent, or Firm—H. Fredrick Hamann; Harry B. Field; David C. Faulkner

[57] ABSTRACT

A refractory solid-state heat pipe assembly, or heat shield, capable of solid-state operation at high and low extreme temperature ranges in hostile environments, with particular application found in hypersonic vehicle surfaces, is provided.

14 Claims, 3 Drawing Sheets

REFRACTORY SOLID-STATE HEAT PIPES AND HEAT SHIELDS

BACKGROUND OF THE INVENTION

1. Field of the Invention

The present invention relates generally to refractory solid-state material heat pipes, and particularly to heat pipes conformally made into heat shields, panel radiators for space power heat radiation, or other purposes in which pipes and surface shields are capable of operating at low and high temperatures in either oxidizing, inert, vacuum, or meteor-filled environments.

2. Description of Related Art

The heat pipe is a thermal device for the efficient transport of thermal energy. It is a closed structure containing a working fluid that transports thermal energy from one part, called the evaporator, where heat is supplied to the device, to another part, called the condenser, where heat is extracted from the device. This energy transport is accomplished by means of liquid vaporization in the evaporator, vapor flow in the core region, vapor condensation in the condenser, and condensate return to the evaporator by capillary action in the wick. The basic idea of the heat pipe was first suggested in 1942, but it was not until 1963 that an actual device based on this idea was built.

Since pressure variations inside the vapor core are normally small, the heat pipe is usually very nearly isothermal and close to the saturated vapor temperature corresponding to the vapor pressure. The capability of transporting large amounts of thermal energy between two terminals (evaporator and condenser) with a small temperature difference is equivalent to having an extra-high thermal conductivity according to Fourier's law. It is like a superconductor in the thermal sense. In addition to its superior heat transfer characteristics, the heat pipe is structurally simple, relatively inexpensive, insensitive to a gravitational field, and silent and reliable in its operation. It can be made into different shapes and can operate at temperatures from the cryogenic regions up to structurally limited high-temperature levels by using various working fluids, ranging from cryogens to liquid metals.

The heat pipe in many aspects is similar to the thermal siphon which has been used for many years. If no wick is used for capillary pumping and the condensate is returned to the evaporator by gravity, the heat pipe becomes indeed a two-phase closed thermal siphon, which is sometimes called the gravity-assisted wickless heat pipe.

Known liquid heat pipes have excellent heat transfer abilities by virtue of the liquid and vapor transport along the heat pipe—hot to cold end. These liquid heat pipes are non-suitable for space applications, resulting from the lack of gravity, meteorite environment, hot and cold extremes, and general internal structural fragility. A puncture or fracture of the casing will yield a complete failure of the unit by leakage and loss from freezing, and it is desired to obviate these problems with a more robust design approach.

Heat shields or heat sinks, and the like, are currently undergoing rapid development utilizing materials including carbon-carbon composites, silicon-based materials, or similar sandwich composites for utilization in ultra-high temperature or ultra-cold temperature environments. However, none of the known materials, structures, or articles of manufacture, designed to protect surfaces operating at extreme temperatures, are capable of functioning without some form of internal cooling fluid generally flowing through cooling channels or tubes within the composite or article.

SUMMARY AND OBJECTS OF THE INVENTION

It is the primary object of the present invention to provide a refractory material solid-state heat pipe, without liquids or vapors, and an article of manufacture utilizing same, which functions effectively at either extremely high or extremely low (cold) temperatures for high heat transport.

It is yet another object of the present invention to provide heat shields, radiator panels configured of heat pipe(s), and the like, capable of operating at temperatures up to about 5000° F. in oxidizing or space environments, and which also have applications at temperatures below −250° F. for refrigeration or vacuum environments.

Yet another object of the present invention is to provide heat shields and the like which can perform in extremely hostile environments without the need of contiguous liquid or gas flow cooling channels and fluids.

Accordingly, the present invention provides for refractory solid-state heat transfer elements including a highly, thermally conductive fibrous substrate having a diamond coating thereabout, and a high thermally conductive containment matrix configured to surround and support the aforesaid fibrous substrate and diamond coating.

BRIEF DESCRIPTION OF THE DRAWINGS

For a more complete understanding of the present invention, this description should be read together with the accompanying drawings, wherein.

DESCRIPTION OF PREFERRED EMBODIMENTS

Figure 3:
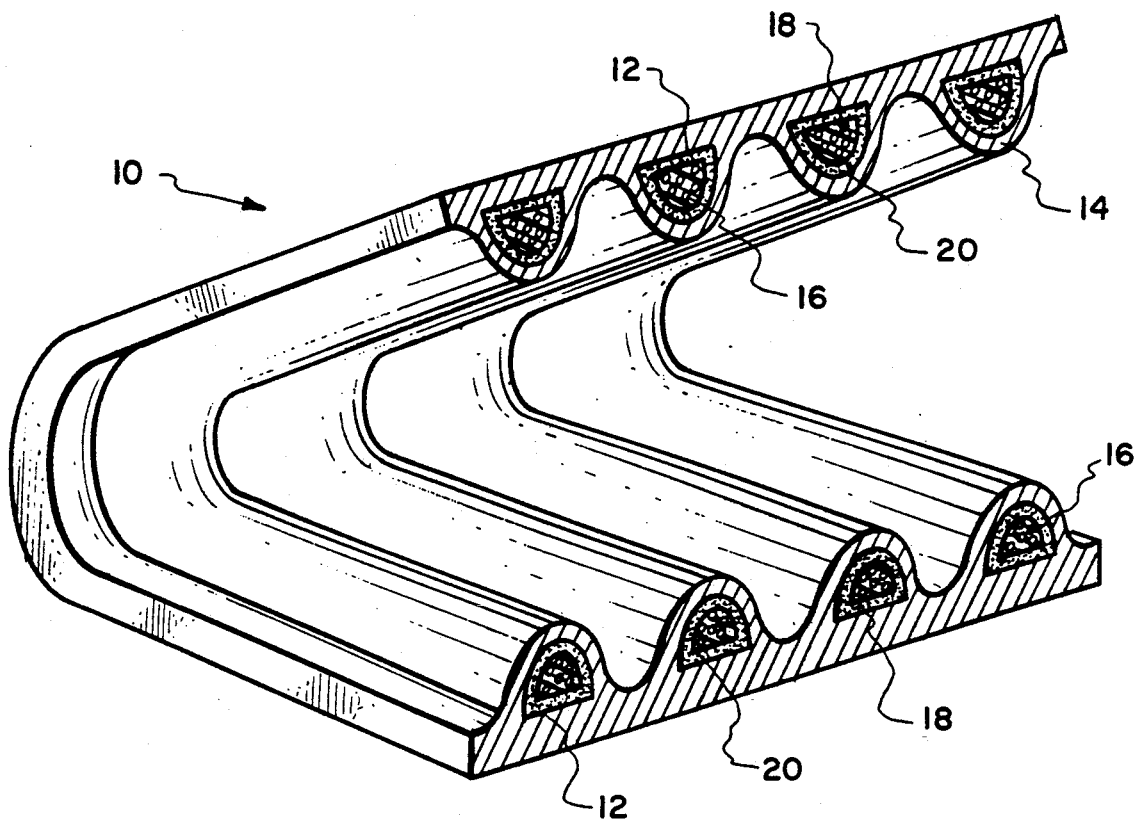
FIG. 3 schematically depicts a section of a hypersonic wing leading edge, fabricated utilizing refractory solid-state heat pipes of the present invention.
Figure 4:
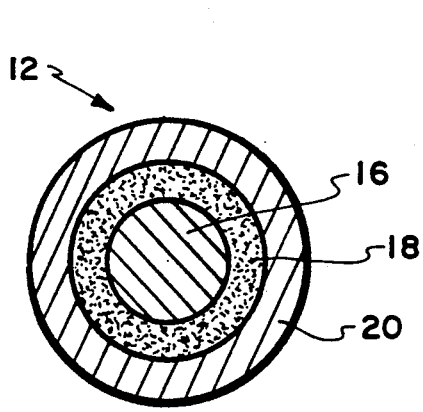
FIGS. 4 and 5 are cross-sectional views of heat pipe core elements, in accordance with the present invention.
Figure 5:
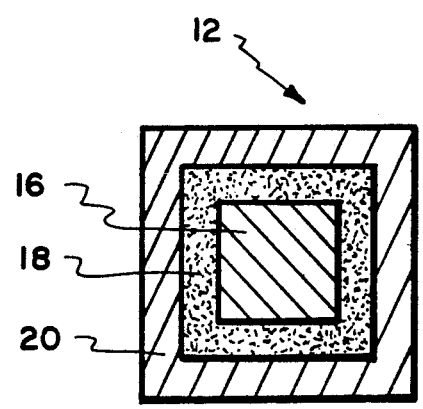

As shown in the Figures, individual heat transfer elements 12 are arranged in a heat pipe 10 within an encasing wall 14. Each element 12 comprises a thermally conductive solid substrate or filament 16 having a diamond film or overcoat 18 and a surrounding containment matrix or layer 20. Various embodiments of the heat transfer elements are shown in FIGS. 3-5.

The diamond coating 18 may be applied by diamond film deposition such as disclosed in U.S. Pat. No. 4,822,466 incorporated herein by reference. The substrate, or filament 16, is a thermally conductive material, and preferably a carbon or silicon based material, (e.g. carbon or a diamond-like silicon filament). The diamond film coating 18 applied about the filament is deposited thereon to a depth of from about 0.001 inch to 0.010 inch.

The thermally conductive containment matrix 20 fabricated or configured to surround and support the diamond coated substrate 16 is a thermally conductive material selected from any number of good thermal conductors. Specifically, however, molybdenum, tungsten, rhenium, or oxide materials are preferred for use in the high temperature ranges; and gold, silver, copper, aluminum, or beryllium at low temperatures in the hostile environments in which articles of the present invention must function.

Figure 1:
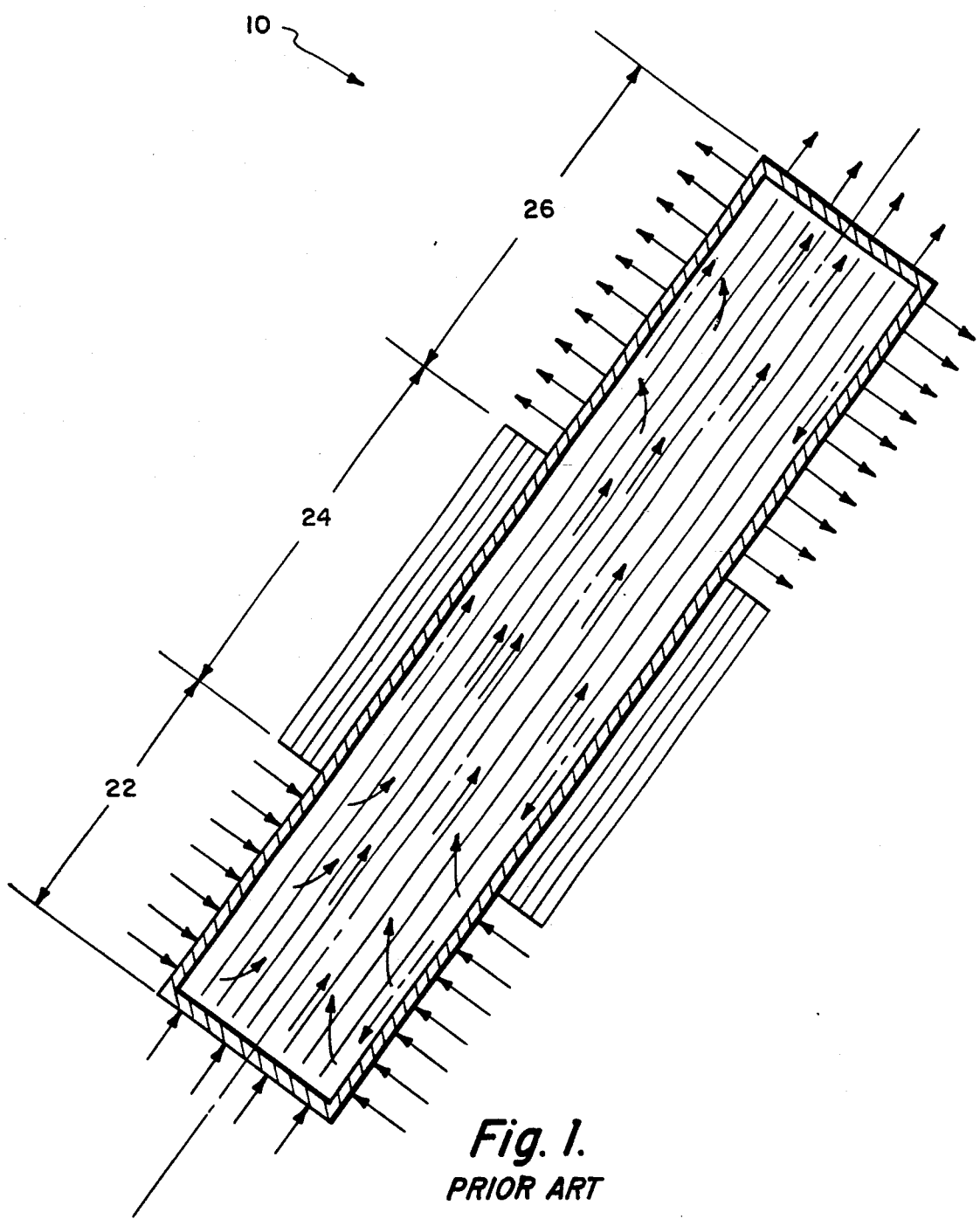
FIG. 1 is a cross-sectional view of a heat pipe as known in the art.
Figure 2:
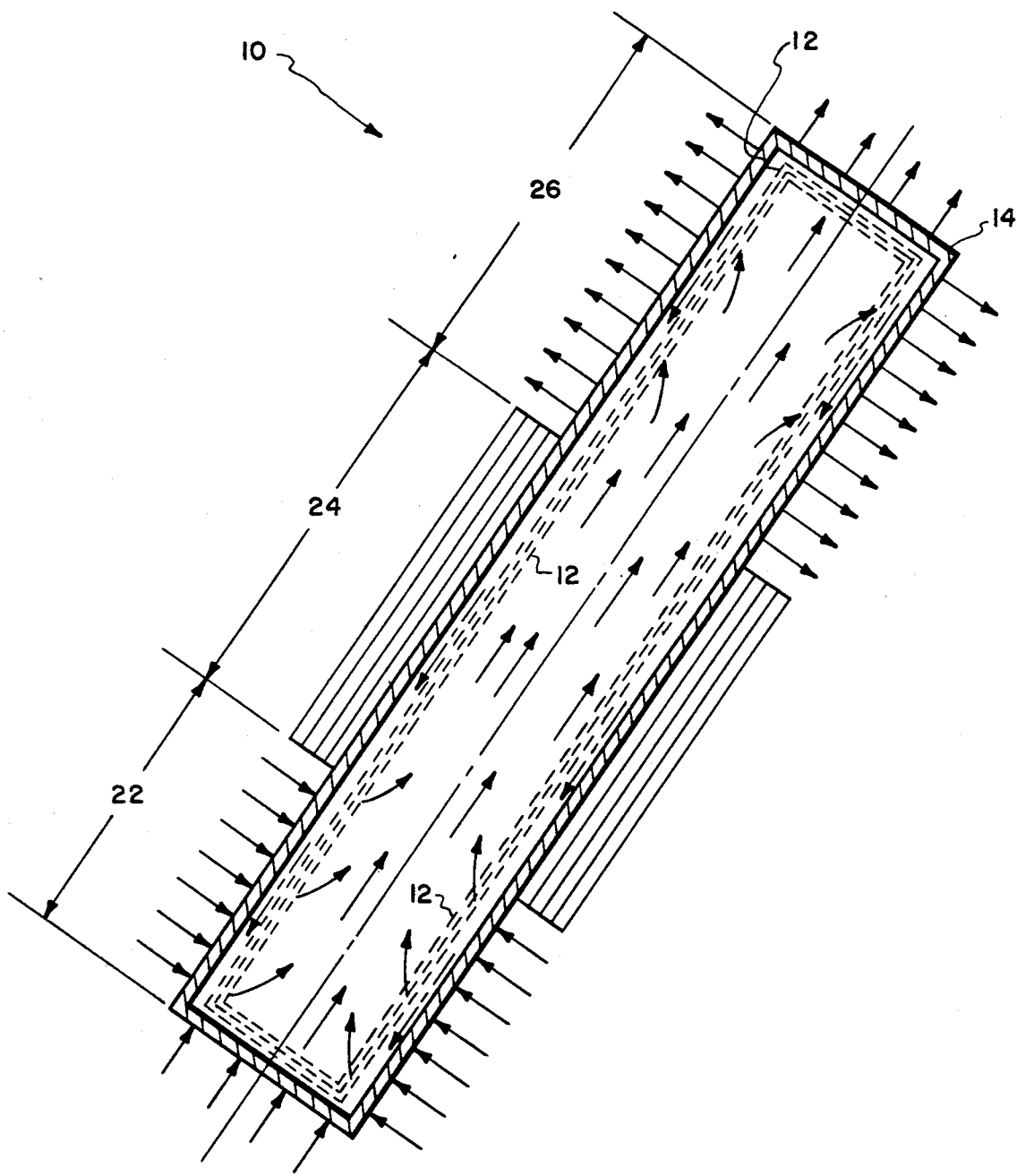
FIG. 2 illustrates a heat transport refractory solid-state heat pipe in cross section, in accordance with the present invention.

In operation (see FIG. 2), a heat input section 22 of a heat pipe 10 transports heat radially inward into the containment matrix 20, the diamond coating 18 and the fibrous-like longitudinal substrates or filaments 16. Heat is rapidly transported lengthwise as depicted by the arrows, principally by the coated elements, and to a lesser degree by the containment matrix material, through an adiabatic section 24 of the pipe, and into a heat output section 26 where it is discharged into a heat sink medium (not shown).

Applications, such as the leading edge 28 of FIG. 3, also include cooling stagnation regions of hypersonic vehicles (nose caps), cooling nozzle and throat areas of jet and rocket designs, waste heat recovery from nuclear and fossil fuel plants, and thermally inert structures, such as space antennae, mirrors, laser platforms, space radiators, and cryogenic telescopes of high resolution in space.

One primary application for the present invention is to cool leading edges, and nose caps of hypersonic vehicles such as the National Aerospace Plane (NASP).

Alternate applications of the heat pipes and high temperature heat shield of the present invention include waste heat recovery from fossil or nuclear fuel power plants, high temperature radiators for rejecting heat into space, and cooling the throat and/or nozzle sections of jet or rocket engines.

The utilization of a high thermal conductivity diamond film coated fibrous-like material substrate in heat pipe transfer elements, according to the present invention, allows for a functional solid-state heat pipe assembly, or high temperature heat shield, capable of operating without the necessity of any fluid coolant in working contact with any of the heat shield surfaces. Thus, the savings in heat shield complexity and attendant weight disadvantages are eliminated by the present invention, and improved reliability is accomplished.

What is claimed is:

1. A refractory solid state heat pipe including at least one heat transfer element, said element comprising:
   (a) a thermally conductive solid substrate and a diamond coating about said substrate; and
   (b) a thermally conductive containment matrix configured to surround and support said substrate and diamond coating.

2. The heat pipe of claim 1, wherein the conduit substrate is a carbon or silicon based material.

3. The heat pipe of claim 1, wherein the diamond coating is deposited on said substrate to a depth of from 0.001 inch to 0.010 inch.

4. The heat pipe of claim 1, wherein the containment matrix is a conductive material selected from molybdenum, tungsten, or rhenium.

5. A high temperature heat shield having at least one surface exposed to temperatures above 2700° F., and including sub-surface refractory solid state heat pipes, said heat pipes including at least one heat transfer element, said element further comprising:
   (a) a thermally conductive substrate and a diamond coating about said substrate; and
   (b) a thermally conductive containment matrix configured to surround and support said substrate and diamond coating.

6. The heat shield of claim 5, wherein the conduit substrate is a carbon or silicon based material.

7. The heat shield of claim 5, wherein the diamond coating is deposited on said substrate to a depth of from 0.001 inch to 0.010 inch.

8. The heat shield of claim 5, wherein the containment matrix is a conductive material selected from molybdenum, tungsten, or rhenium.

9. A method of forming a refractory solid state heat pipe having at least one heat transfer element, said method comprising:
   (a) fabricating a thermally conductive solid substrate with a diamond coating deposited on said substrate;
   (b) configuring a thermally conductive containment matrix surrounding and supporting said substrate and diamond coating to form a heat transfer element; and
   (c) enclosing at least one heat transfer element by an encasing wall.

10. The method of claim 9, wherein the thermally conductive solid substrate is a metal.

11. The method of claim 9, wherein the containment matrix is a metal.

12. The method of claim 9, wherein the conductive substrate is a carbon or silicon based material.

13. The method of claim 9, wherein the diamond coating is deposited on said substrate to a depth of from 0.001 inch to 0.010 inch.

14. The method of claim 9, wherein the containment matrix is a conductive material selected from molybdenum, tungsten, or rhenium.

* * * * *